United States Patent [19]

Fisher et al.

[11] Patent Number: 5,398,158
[45] Date of Patent: Mar. 14, 1995

[54] MULTIPLE DISK DRIVE MODULE WITH STANDARD FROM FACTOR

[75] Inventors: John G. Fisher, Congleton; Stephen Gold, Reading, both of England

[73] Assignee: International Computers Limited, United Kingdom

[21] Appl. No.: 31,662

[22] Filed: Mar. 15, 1993

[30] Foreign Application Priority Data

May 2, 1992 [GB] United Kingdom ............... 9209573

[51] Int. Cl.⁶ .................... H05K 7/06; G06F 1/16
[52] U.S. Cl. ........................ 361/685; 360/97.01
[58] Field of Search ............. 360/94, 97.01, 137; 361/685; 312/223.2; 364/708.1

[56] References Cited

U.S. PATENT DOCUMENTS 5,124,886 6/1992 Golobay ............... 361/685 X
5,211,459 5/1993 Wu ....................... 312/223.2

OTHER PUBLICATIONS

"IEEE Spectrum", p. 48, Apr., 1992.

Primary Examiner—Michael W. Phillips
Attorney, Agent, or Firm—Lee, Mann, Smith, McWilliams, Sweeney & Ohlson

[57] ABSTRACT

A disk drive module is described which externally has the physical and electrical appearance of a single standard 5.25 inch disk drive, but which internally contains five 2.5 inch disk drives and the electronics for operating them as resilient disk array. The disk drives are mounted on printed circuit boards which extend substantially the full length of the module. This provides a high data transfer rate and extremely high data reliability, and because the module has a standard form factor, it can be fitted to all types of system that can accommodate this form factor.

8 Claims, 4 Drawing Sheets

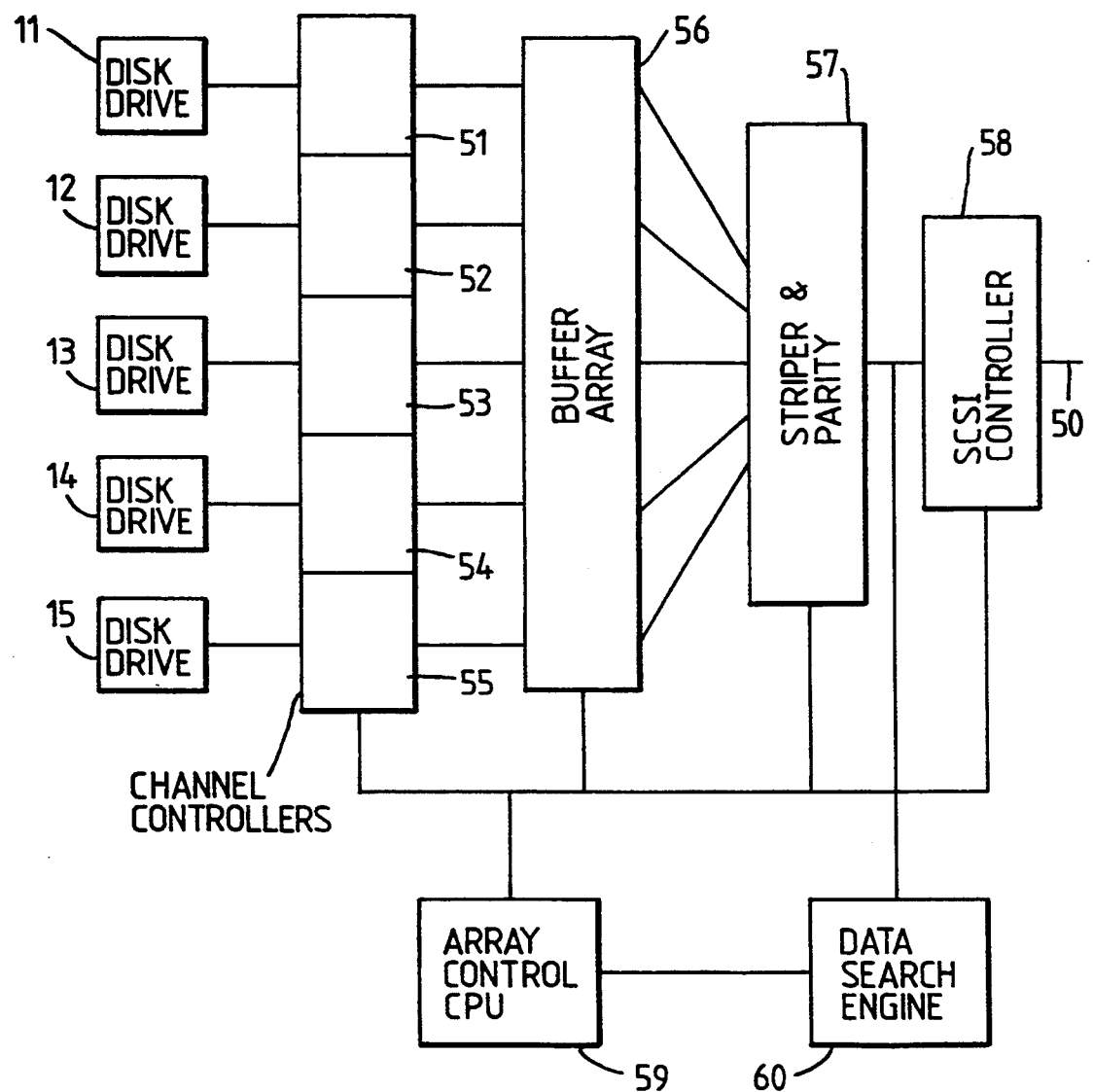

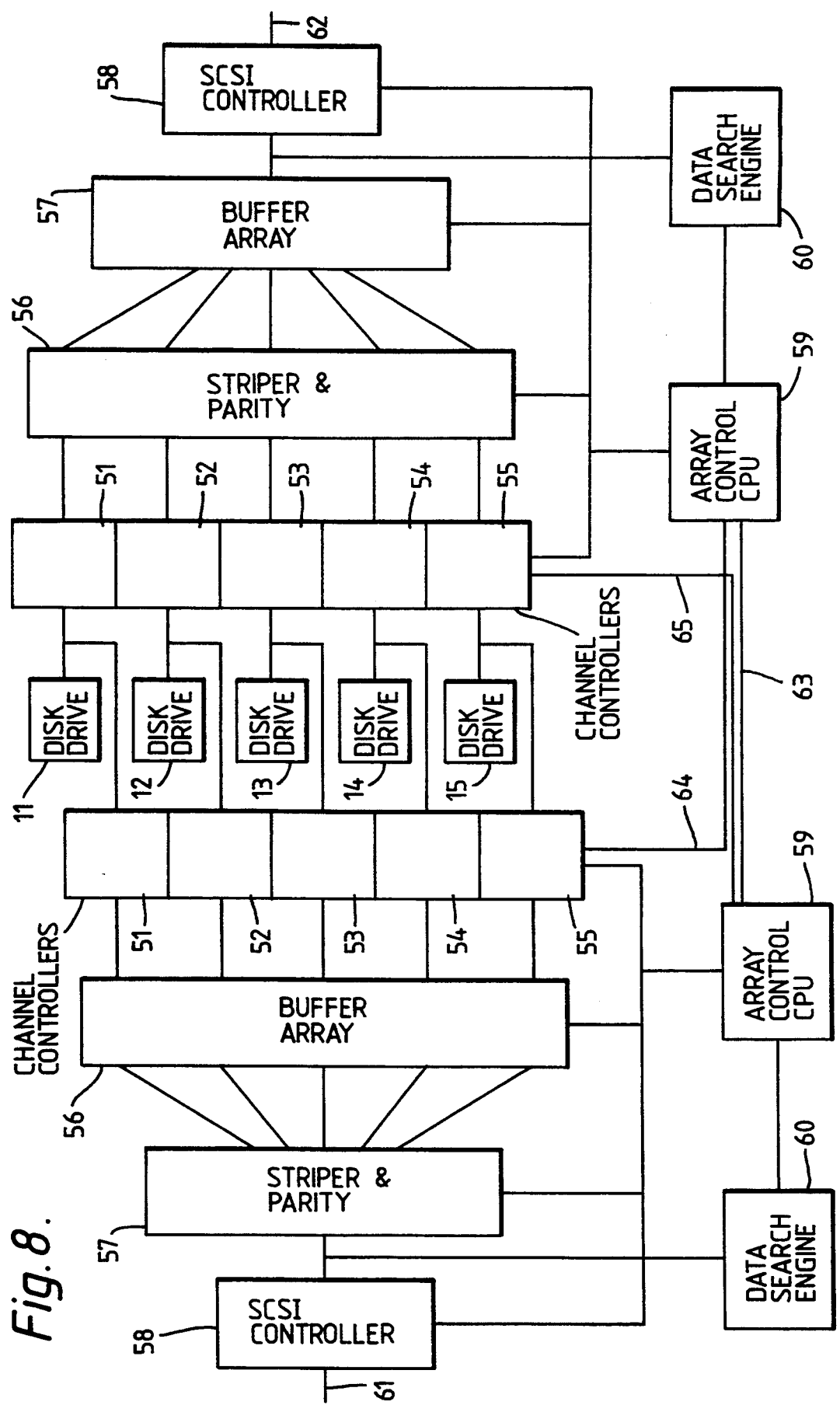

MULTIPLE DISK DRIVE MODULE WITH STANDARD FROM FACTOR

BACKGROUND TO THE INVENTION

This invention relates to disk drive arrays.

A disk drive is a data storage device in which data is stored magnetically on a rotatable disk. The invention is particularly concerned with fixed disk drives; that is, with drives in which the disk is not removable in normal operation.

Disk drive units are conventionally packaged in one of a number of standard form factors, to allow them to fit into standard slots of a computer system. For example, one standard configuration uses disk of 5.25 inches (133 mm) diameter, packaged in a housing of dimensions 3.25×5.75×8 inches (83×146×203 mm).

It is known to connect a number of separate disk drives (typically multiples of 5) together to form a resilient disk array which can tolerate failure of any one disk by storing data in a redundant manner (e.g. as groups of 4 data bits plus one parity bit).

The object of the present invention is to provide a new configuration for such a resilient disk array.

SUMMARY OF THE INVENTION

According to the invention there is provided a disk drive module comprising a housing containing a plurality of fixed disk drive units wherein each disk drive unit substantially conforms to a first standard form factor, and the housing conforms to a second, larger standard form factor, the housing also containing a control circuit for operating the disk drive units as a resilient disk array.

BRIEF DESCRIPTION OF THE DRAWINGS

FIG. 7 is a block diagram of an array control circuit with a single access port.

FIG. 8 is a block diagram of an alternative array control circuit allowing dual port access.

DESCRIPTION OF EMBODIMENTS OF THE INVENTION

Embodiments of the invention will now be described by way of example with reference to the accompanying drawings.

Figure 1:
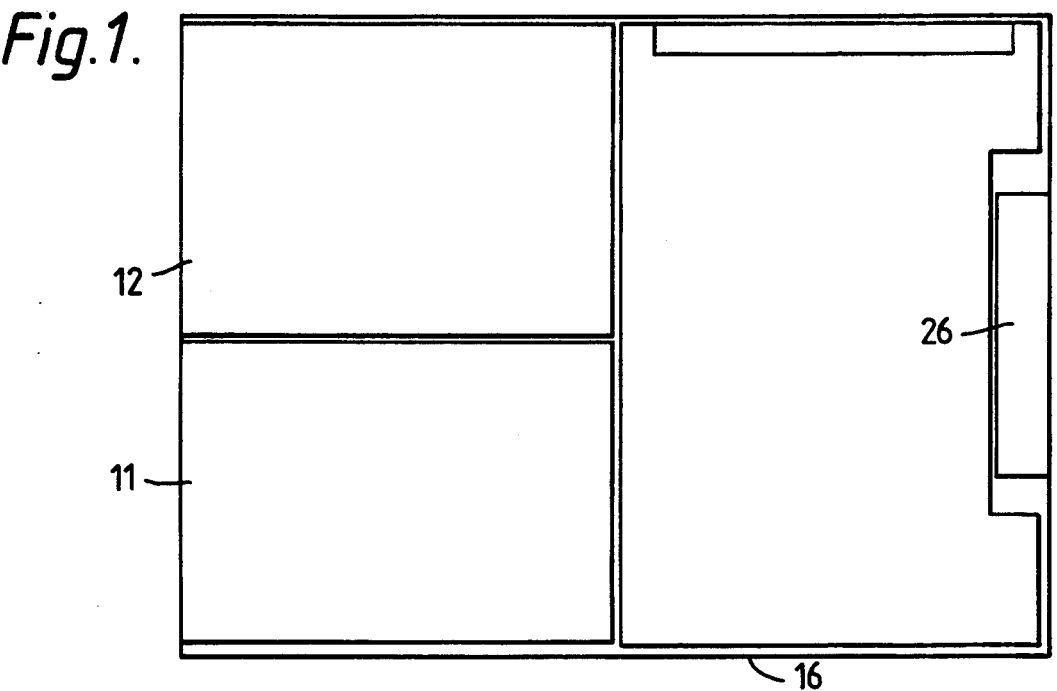
FIGS. 1–3 are top, front and side views of a first disk array configuration.
Figure 2:
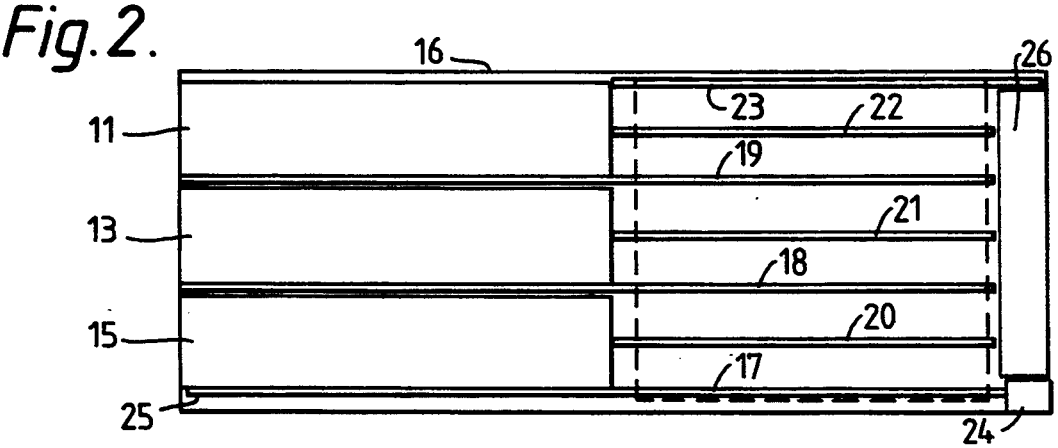
Figure 3:
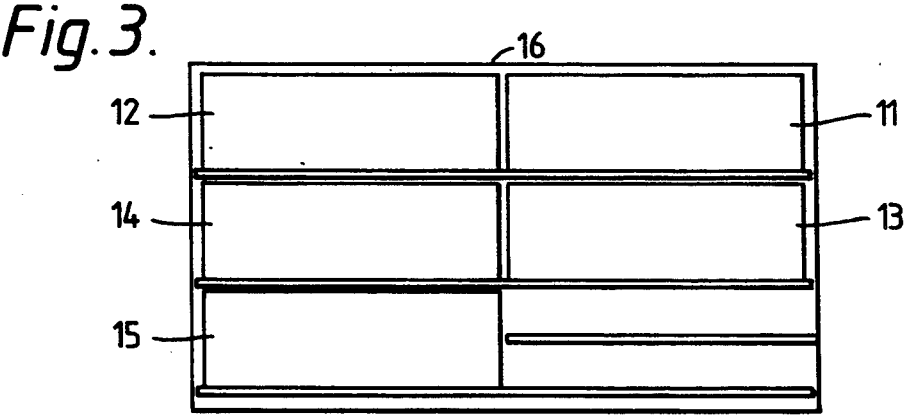

Referring to FIGS. 1 to 3, this shows a disk drive array comprising five standard 2.5 inch (64 mm) disk drive units 11–15, packaged in a standard 5.25 inch (133 mm) full high form factor housing 16; i.e. a housing of dimensions 3.25×5.75×8 inches (83×146×203 mm).

In this embodiment the disk drive units are mounted horizontally in three layers. The disk drive units are mounted on three PCBs (printed circuit boards) 17–19 which extend the full length of the housing. Four further PCBs 20–23, extending only half the length of the housing, are also provided. All the PCBs 17–23 carry electronic components for controlling the disk array.

All the disk drive units 11–15 are hot-pluggable: that is, they can be removed and replaced while the system is powered up and running, without disrupting the operation of the system.

The lowest PCB 17 carries connectors 24 along its rear edge, for connecting the array to a standard SCSI computer bus. In addition, it may also carry further connectors and/or status indicators along its front edge 25.

The housing contains a cooling fan 26 for air cooling the disk units and the components on the PCBs.

Figure 4:
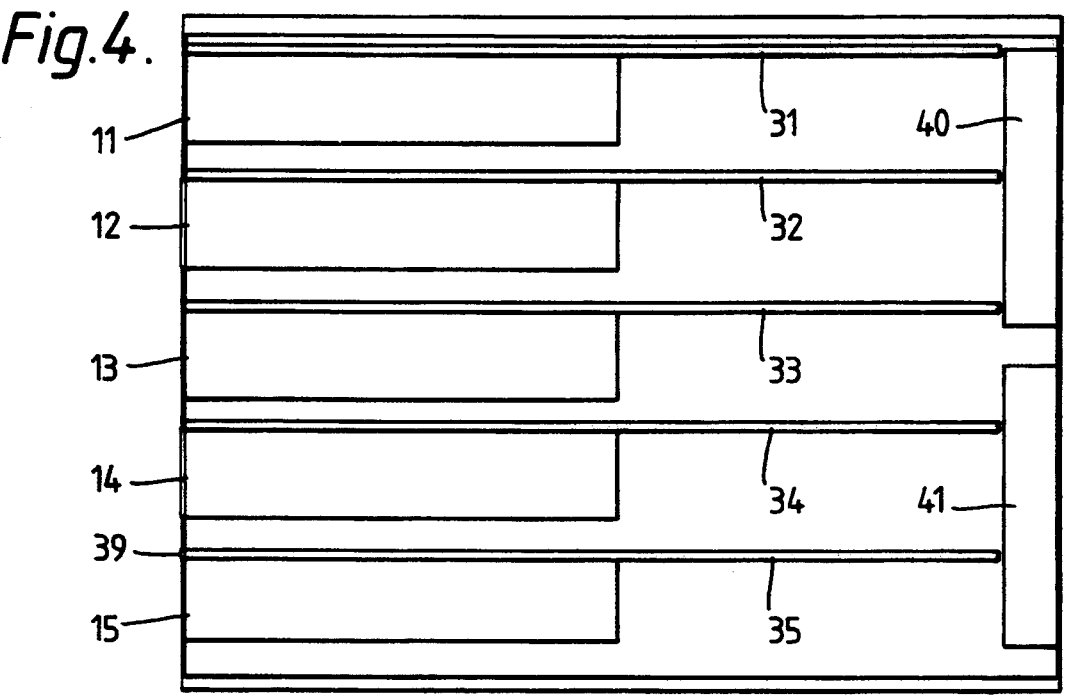
FIGS. 4–6 are top, front and side views of an alternative disk array configuration.
Figure 5:
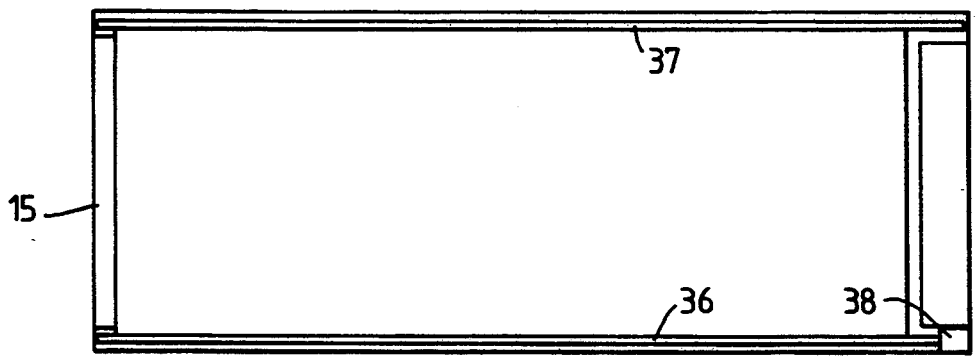
Figure 6:
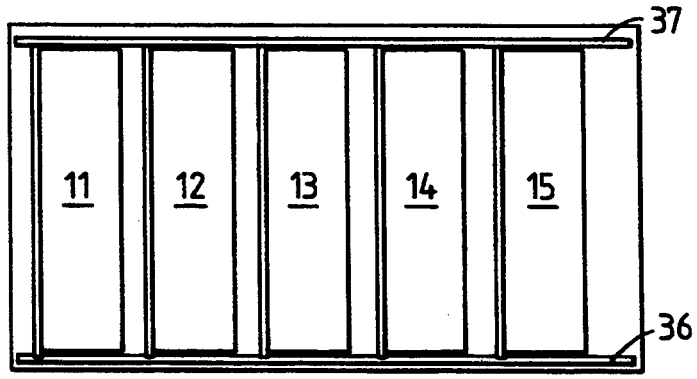

Referring now to FIGS. 4 to 6, these show an alternative configuration for the disk array. As before, five standard 2.5 inch disk drive units 11–15 are packaged in a standard 5.25 inch form factor housing 16. However, in this case the disk drive units are mounted vertically.

The disk drive units are mounted on respective PCBs 31–35 which extend the full length of the housing. These five PCBs are all connected to two main PCBs 36, 37 positioned at the top and bottom of the housing. All the PCBs 31–37 carry electronic components for controlling the array. Because of the spacing between the disk drives, components may be mounted on the PCBs 31–35 between the drives. Additional short PCBs (not shown) may be fitted in the rear section of the unit behind the disc modules.

One of the main PCBs 36 carries connectors 38 along its rear edge, for connecting with a standard computer bus. The PCBs 31–35 may carry status indicators along their front edges 39.

The housing contains two cooling fans 40, 41 for air cooling the disk units and the components on the PCBs. Two fans are required in this case to achieve even air flow over the components.

Compared with the configuration of FIGS. 1–3, this alternative configuration has the advantage of greater spacing between the disk drive units, improving the cooling of the disk units. Also, it allows a common design for the drive module PCBs 31–35 to be used. However, the combination of horizontal and vertical PCBs makes interconnection more complex.

Alternative configurations, particularly of PCBs and cooling could also be used.

Referring now to FIG. 7, this shows a first form of control circuit for the disk array, allowing access from a single SCSI (Small Computer System Interface) port 50. A typical RAID 3 (RAID stands for Redundant Array of Inexpensive Disks) configuration is shown, but a RAID 5 architecture could also be used.

The five disk drive units 11–15 are respectively connected to five channel controllers 51–55 which control reading and writing of data from the disks. The channel controllers are connected to a buffer array 56 which buffers the data. The buffer array is connected to a striper and parity circuit 57, which generates parity bits for data written to the disk array, checks parity bits for data read from the array and reconstructs missing data in the event of failure of a single disk drive. The striper and parity circuit is connected to an SCSI controller 58 which in turn is connected to the SCSI port 50.

The control circuit also includes an array control CPU 59 which controls the overall operation of the disk array. An optional data search engine 60 may also be included to carry out searches on data held in the disk array.

All the components 51–60 may be standard components and so, need not be described further.

Referring now to FIG. 8, this shows an alternative form of control circuit, allowing access from dual SCSI ports 61, 62. Again either RAID 3 or RAID 5 could be used, the same RAID 3 layout used for the single channel is shown.

In this circuit, the channel controllers 51–55, buffer array 56, striper and parity circuit 57, SCSI controller 58, array control CPU (Central Processing Unit) 59 and search CPU 60 are all duplicated for the two SCSI channels.

In addition, communication paths 63–65 are provided between the two channels. Path 63 provides communication between the two array control CPUs 59 to pass fault information between the channels in the event of failure of one of the SCSI channels. Paths 64, 65 provide communication between the two array control CPUs 50 and the five channel controllers 51–55 of the other SCSI channel, so that in the event of failure of one SCSI channel, the other SCSI channel can block the failed channel from accessing the disks.

This circuit provides dual access to all data. Therefore, failure of one SCSI channel or one array controller does not prevent access to the data. There is only a single point failure in this resilient scheme at the interface to each drive module. As a single drive may fail under either RAID 3 or RAID 5, this single failure point is also protected from causing an immediate loss of access to data.

In summary, it can be seen that each of the described embodiments of the invention provides a disk drive module which externally has the physical and electrical appearance of a single standard 5.25 inch disk drive, but which internally contains five 2.5 inch disk drives and the electronics for operating them as a resilient disk array, providing a high data transfer rate and extremely high data reliability.

Because the module has a standard form factor, it can be fitted to all types of system that can accommodate this form factor. The fact that the module contains a disk array will be completely transparent to the system.

We claim:

1. A disk drive module comprising a housing containing a plurality of printed circuit boards extending substantially the full length of the housing, and a plurality of fixed disk drive units mounted on said printed circuit boards, wherein each disk drive unit substantially conforms to a first standard form factor, and the housing conforms to a second, larger standard form factor, the housing also containing a control circuit for operating the disk drive units as a resilient disk array.

2. A module according to claim 1 wherein the housing has a 5.25 inch disk drive form factor and the individual fixed disk units each have a 2.5 inch disk drive form factor.

3. A module according to claim 1 containing a multiple of five fixed disk drive units.

4. A module according to claim 1 wherein the control circuit comprises two independent channels for allowing dual port access to the disk array.

5. A disk drive module comprising a housing containing a plurality of printed circuit boards mounted within said housing, and a plurality of fixed disk drive units mounted on said printed circuit boards, wherein each disk drive unit substantially conforms to a first standard form factor, and the housing conforms to a second, larger standard form factor, the housing also containing a control circuit for operating the disk drive units as a resilient disk array.

6. A module according to claim 5 wherein the housing has a 5.25 inch disk drive form factor and the individual fixed disk units each have a 2.5 inch disk drive form factor.

7. A module according to claim 5 containing a multiple of five fixed disk drive units.

8. A module according to claim 5 wherein the control circuit comprises two independent channels for allowing dual port access to the disk array.

* * * * *